United States Patent
Kothawade et al.

(10) Patent No.: US 12,043,710 B2
(45) Date of Patent: Jul. 23, 2024

(54) TWO-COMPONENT, WATER-BASED LAMINATION ADHESIVE AND USE OF THE SAME TO BOND SUBSTRATES AND FOAMS

(71) Applicant: Henkel AG & Co. KGaA, Duesseldorf (DE)

(72) Inventors: Sandeep Kothawade, Maharashtra (IN); Girdhari Kumar, Maharashtra (IN); Abhijit Hirekerur, Troy, MI (US); Umesh Harkal, Maharashtra (IN); Emilie Smith-Heberer, Rochester Hills, MI (US)

(73) Assignee: Henkel AG & Co. KGaA, Duesseldorf (DE)

( * ) Notice: Subject to any disclaimer, the term of this patent is extended or adjusted under 35 U.S.C. 154(b) by 130 days.

(21) Appl. No.: 17/448,571

(22) Filed: Sep. 23, 2021

(65) Prior Publication Data

US 2022/0002600 A1 Jan. 6, 2022

Related U.S. Application Data

(63) Continuation of application No. PCT/US2020/024811, filed on Mar. 26, 2020.

(30) Foreign Application Priority Data

Mar. 27, 2019 (IN) .............................. 201941011911

(51) Int. Cl.
*C09J 5/06* (2006.01)
*C08G 18/02* (2006.01)
(Continued)

(52) U.S. Cl.
CPC .............. *C08J 5/121* (2013.01); *C08G 18/02* (2013.01); *C08G 18/0819* (2013.01);
(Continued)

(58) Field of Classification Search
CPC .................. B29C 66/345; B29C 63/04; B32B 2037/1276; C08G 18/02; C08G 18/0819;
(Continued)

(56) References Cited

U.S. PATENT DOCUMENTS 5,494,960 A 2/1996 Rolando et al.
5,861,470 A 1/1999 Voss et al.
(Continued)

FOREIGN PATENT DOCUMENTS

CN 102452210 A 5/2012
CN 104918976 A 9/2015
WO WO-2016162394 A1 * 10/2016 ............... A43B 9/12

OTHER PUBLICATIONS

"Desmodur DN" Product Datasheet from Covestro Jul. 2018.*
International Search Report for International PCT Patent Application No. PCT/US2020/024811 dated Jul. 21, 2020.

*Primary Examiner* — John L Goff, II
(74) *Attorney, Agent, or Firm* — James E. Piotrowski

(57) ABSTRACT

A water comprising, two component polyurethane dispersion adhesive comprising an anionic polyester polyurethane resin and a solvent-free liquid aliphatic polyisocyanate cross-linker. The dispersion can be reactivated one or more times for edge bonding a flexible sheet material onto a substrate having a main surface, a peripheral surface and an edge connecting the main surface and the peripheral surface.

12 Claims, 1 Drawing Sheet

(51) Int. Cl.
*C08G 18/08* (2006.01)
*C08J 5/06* (2006.01)
*C08J 5/12* (2006.01)
*C09J 175/06* (2006.01)

(52) U.S. Cl.
CPC ............ *C08G 18/0866* (2013.01); *C08J 5/06* (2013.01); *C09J 5/06* (2013.01); *C09J 175/06* (2013.01); *C08G 2110/0008* (2021.01); *C08G 2170/80* (2013.01); *C09J 2409/006* (2013.01); *C09J 2423/106* (2013.01); *C09J 2475/008* (2013.01)

(58) Field of Classification Search
CPC ........ C08G 18/0866; C08G 2110/0008; C08G 2170/80; C08J 5/121; C08J 5/127; C08J 2375/04; C08J 2475/04; C09J 175/06; C09J 175/04; C09J 5/06; C09J 2409/006; C09J 2423/106; C09J 2475/008; C09J 2475/00

See application file for complete search history.

(56) References Cited

U.S. PATENT DOCUMENTS

| | | | |
|---|---|---|---|
| 5,872,182 | A | 2/1999 | Duan et al. |
| 6,194,035 | B1* | 2/2001 | Guilhem ................. B05D 5/10 427/314 |
| 11,802,226 | B2 | 10/2023 | Mai et al. |
| 2002/0077413 | A1 | 6/2002 | Kitada et al. |
| 2017/0203543 | A1 | 7/2017 | Kinzelmann et al. |
| 2018/0105722 | A1 | 4/2018 | Tillack et al. |
| 2018/0179319 | A1 | 6/2018 | Schmatloch et al. |
| 2019/0010362 | A1 | 1/2019 | Lin et al. |

\* cited by examiner

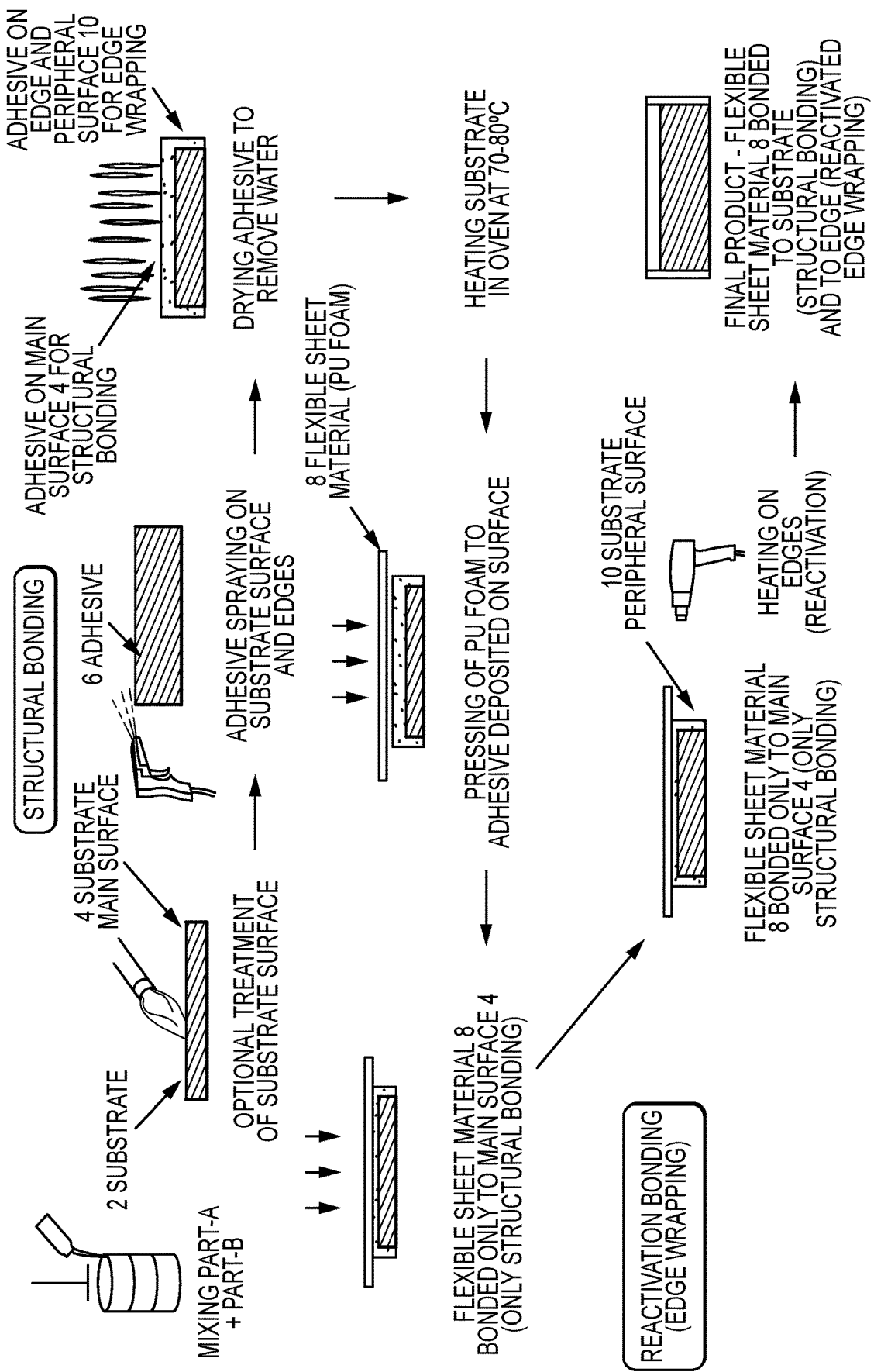

TWO-COMPONENT, WATER-BASED LAMINATION ADHESIVE AND USE OF THE SAME TO BOND SUBSTRATES AND FOAMS

FIELD OF THE INVENTION

The present disclosure relates to a water-based, two component polyurethane dispersion adhesive and use of this adhesive for bonding flexible sheet materials such as polyurethane foams to substrates, especially polymeric substrates such as found in automobile interiors. More particularly, the present disclosure relates to a water-based, two component polyurethane adhesive that can be reactivated.

BRIEF DESCRIPTION OF RELATED TECHNOLOGY

Automotive trim applications such as in the interiors of the cars often involve bonding flexible sheet materials such as foams, leather substrates, and the like to polymer substrates such as polypropylene (PP) or acrylonitrile butadiene styrene (ABS). Water-based adhesives for such applications may offer low or zero volatile organic compounds (VOC). In addition, water-based adhesives may offer ease of processing and good heat dissipation, thereby making them convenient for manufacturing at production plants.

Many automotive trim applications involve the placement of flexible sheet materials such as foams over substrate surfaces, around the substrate edge and onto a peripheral surface of the substrate. The peripheral surfaces in many cases are angularly arranged with respect to the main surface. An aqueous adhesive is typically disposed over such substrate surfaces and edges, followed by placement of a flexible sheet material over these substrate surfaces and edges, for example by wrapping or partially wrapping a singular piece of flexible sheet material over the surfaces, edges and peripheral surfaces. Unless adequate contact of the foam and the substrate surfaces and edges is maintained during drying and curing of the aqueous adhesive, the foam will separate from one of the substrate surfaces and/or from the edge causing a failure. Maintaining sufficient contact for the long drying and curing times required by aqueous adhesives is often difficult, especially for substrates having complex and changing edge geometries.

SUMMARY OF THE INVENTION

The disclosed water-based, two component polyurethane adhesive dispersions not only offer excellent structural bonding properties but also provide the ability to reactivate the adhesive one or more times by heating above a reactivation temperature. Reactivation of the adhesive allows for edge wrapping, as per a customer's specification, of a layer of flexible sheet material, such as a foam, including a polymeric foam such as a polyurethane foam, over a substrate, around the edges of the substrate and onto a peripheral surface of the substrate without the disadvantages of currently used adhesives.

In one aspect of the present invention, a method of bonding a flexible sheet material to a substrate includes:
  providing a substrate having a main surface, a peripheral surface angularly arranged to the main surface and an edge connecting the main surface and the peripheral surface;
  providing a singular piece of flexible sheet material having first and second portions;
  providing a water-based, two component polyurethane dispersion;
  applying the water-based polyurethane dispersion to a some or all of the main surface and optionally to some or all of the peripheral surface of the substrate;
  removing water from the applied water-based polyurethane dispersion to form a dried polyurethane adhesive layer on the surfaces;
  applying a first heating cycle to activate the polyurethane adhesive layer on the main surface;
  disposing the first portion of the flexible sheet material over the activated adhesive on the main surface to bond the first portion of material to the main surface;
  optionally, cooling the polyurethane adhesive and substrate surfaces below the adhesive activation temperature;
  applying a second heating cycle to heat the polyurethane adhesive layer on an edge and/or the peripheral surface above the reactivation temperature and reactivate the adhesive on the edge and/or peripheral surface;
  disposing a second portion of the layer of material over the heated and reactivated adhesive on the edge and/or the peripheral surface to bond the second portion of material to the edge and peripheral surface; and
  optionally, cooling the polyurethane adhesive and substrate surfaces below the adhesive activation temperature.

In one embodiment the substrate may be a plastic or plastic containing substrate, such as a polypropylene (PP) or an acrylonitrile butadiene styrene (ABS) containing substrate.

In one embodiment the flexible sheet material can comprise a flexible sheet foam material, such as a polyurethane foam material, flexible leather sheet, polymeric film or sheet, clothe and combinations thereof.

In one embodiment the first heating cycle can be performed after the first portion of material is disposed over the main surface.

In one embodiment the first heating cycle can comprise heating the polyurethane adhesive layer and the main surface in an oven at about 60° C. to about 80° C. for about 2 to about 4 minutes.

In one embodiment the second heating cycle can include exposing the edge and the peripheral surface of the substrate and the polyurethane adhesive layer on the edge and the peripheral surface to a temperature of about 200° C. to about 300° C. for about 30 seconds or less than 30 seconds prior to disposing a second portion of the layer of material over the heated and reactivated adhesive on edge and the peripheral surface.

In one embodiment the second heating cycle can include exposing the edge and the peripheral surface of the substrate; the polyurethane adhesive layer on the edge and peripheral surface of the substrate and the second portion of the material on the edge and peripheral surface of the substrate to a temperature of about 200° C. to about 300° C. from about 2 seconds to about 4 seconds.

In one embodiment the second heating cycle can include heating the second portion of the material and the peripheral surface of the substrate in an oven at about 60° C. to about 80° C. for a time of about 15 seconds to about 30 seconds.

In one embodiment the second heating cycle can include heating the polyurethane adhesive layer to a temperature from about 55° C. to about 85° C., or preferably from about 55° C. to about 65° C.

In one embodiment one component of the water based, two component polyurethane dispersion adhesive can comprise:
 a solvent-free liquid aliphatic polyisocyanate cross-linker;
 an anionic polyester polyurethane resin; water; and optionally one or more additives After the second heating cycle the cured polyurethane adhesive can have a peel strength of about 4 kgf (kilogram-force) to about 5 kgf.

In one embodiment the one component of the water based, two component polyurethane dispersion adhesive can comprise a solvent free and water free liquid aliphatic polyisocyanate cross-linker and, optionally, one or more additives. The solvent free and water free liquid aliphatic polyisocyanate cross-linker can comprise hexamethylene diisocyanate or a trimer of 1,6-hexamethylene diisocyanate (HDI-biuret).

BRIEF DESCRIPTION OF THE DRAWINGS

Referring now to the drawings wherein like elements are numbered alike in the several Figures:

FIG. 1 is a schematic diagram illustrating structural bonding process steps and reactivation bonding process steps for one embodiment of the invention.

DETAILED DESCRIPTION OF THE INVENTION

The word "about" or "approximately" as used herein in connection with a numerical value refer to the numerical value ±10%, preferably ±5% and more preferably ±1% or less.

Formulation and performance of new classes of water based, two component polyurethane dispersion adhesives for bonding a first polymeric substrate, such as polypropylene, to a flexible sheet material, such as polyurethane foam, is described herein. The disclosed adhesive not only offers improved structural bonding properties, but also confers the ability to reactivate one or more times upon subsequent heating. Reactivation of an adhesive is an important property required for applications such as edge wrapping.

In general, bonding to plastic substrates is difficult due to the low surface energy (less than about 30 dyne/cm) of the plastic substrates. Water-based adhesive are even more difficult to bond as the surface tension (ST) of water (about 72 dyne/cm) is greater than the surface energy of plastic substrates. As per Young's equation, an adhesive can wet the surface of a substrate provided the contact angle (θ) is less than that of 90°. Lowering the surface tension of a water-based adhesive to less than that of plastic surface will typically lead to a lower contact angle resulting in better wettability. The surface tension of the water based, two component polyurethane dispersion adhesive can be reduced with the use of a surfactant. The surface energy of untreated polypropylene is low. The surface energy of such low energy plastic substrates can be increased by various surface treatment methods such as flame treatment, corona treatment, plasma treatment, chemical etching etc. In this way, a water-based polyurethane dispersion may be useful for bonding plastic substrates such as polypropylene, acrylonitrile butadiene styrene, and the like.

The two component, water-based polyurethane dispersion adhesives described herein may bond, for example, flexible sheet polyurethane (PU) foam material to polypropylene (PP) substrate, including a treated PP substrate. The two component, water-based polyurethane dispersion adhesives desirably possess a reactivation property where additional bonding may be done upon heating a second time, such as in edge wrapping applications critical in the door-trim area of a vehicle. For example, door-trim applications often involve two heating cycles, one for bonding flexible foam material onto to flat surface of a part (substrate) and a second for bonding the flexible foam material around the edges and onto the peripheral surface of that substrate.

The polyurethane adhesive dispersions described herein are especially useful to bond polyurethane foam to a polypropylene substrate such as in door-trim application. This usefulness is enhanced by the ability of the adhesive to reactivate upon a second or later heating. Reactivation is the ability of an adhesive to go from a cooled and non-tacky or non-adhesive state to a heated and tacky or adhesive state. Once the adhesive crosslinks it can no longer be reactivated.

Typical current water-based products for bonding polyurethane foam to treated polypropylene have following drawbacks:
 1. Lack of reactivation feature (one or multiple times) making it unsuitable for edge wrapping application.
 2. Use of organic solvents such as N-Methyl-2-pyrrolidone (NMP) and ethanol in the formulation contributing to volatile organic compounds and thus raising undesirable environmental concerns.

The disclosed compositions are water-based, preferably substantially solvent free, and can be reactivated multiple times by reheating. In one embodiment the adhesive is a 2 component (2K), water based, polyurethane adhesive that is substantially free of organic solvents such as N-Methyl-2-pyrrolidone (NMP) and ethanol and other volatile organic compounds. As used herein substantially free means the individual components and mixed adhesive dispersion contain less that 1 wt. % of an organic solvent, preferably less than 0.1 wt. % of an organic solvent and more preferably no (0 wt. %) organic solvent, based on the weight of the individual component or mixed dispersion respectively.

The disclosed composition comprise Part-A and Part-B. Part-A is a water-based polyurethane dispersion formulation. Part-B is a cross-linker formulation.

In one embodiment the Part-A component comprises one or more polyurethane dispersion(s) and water. The Part-A component can optionally comprise additives selected from surfactant, copolymer, colorant, dye, biocide, defoamer and rheology modifier. Table 1 illustrates some properties of one embodiment of the Part-A composition.

TABLE 1

| Properties of Composition: Part-A | |
|---|---|
| Property | Specifications |
| Solid content | 43 to 47% |
| Viscosity (@ 25° C. and 10 rpm) | 5000 to 9000 mPa · s |
| pH | 7.5 to 9.5 |

In one embodiment the Part-B component comprises a crosslinker that is reactive with the Part-A component. Part-B can comprise one or more aliphatic polyisocyanates. In one embodiment the Part-B component can comprise a solvent-free liquid aliphatic polyisocyanate cross-linker. In one embodiment the Part-B component can comprise hexamethylene diisocyanate or a trimer of 1,6-hexamethylene diisocyanate (HDI-biuret). Table 2 illustrates some properties of the Part-B component.

TABLE 2

Formulation Inventive Composition Part-B

| Raw Material | NCO content | HDI monomer content |
|---|---|---|
| Aliphatic Polyisocyanate[1] | 21.8 ± 0.6 | ≤0.25 |

Part-A is mixed with Part-B to form a water based, polyurethane dispersion. Mixing Part-A and Part-B initiates a crosslinking or curing reaction. This reaction is the main curing reaction. The disclosed polyurethane dispersion adhesives are not moisture curable adhesives and are not moisture curable hot melt adhesives. The relative amounts of the Part-A and Part-B components can be varied as needed to achieve the desired properties, but can be in the range of 80 to 99 wt. % Part-A component and 1 to 20 wt. % of Part-B component. Preferably the relative amounts of the Part-A and Part-B components are in the range of 93 to 97 wt. % Part-A and 3 to 7 wt. % Part-B. Table 3 illustrates some properties of a water based polyurethane dispersion adhesive shortly after mixing Part-A and Part-B.

TABLE 3

Properties of Mixed Product of Compositions: Part-A and Part-B

| Property | Specifications |
|---|---|
| Solid content | 44 to 48 wt. % |
| water content | 52 to 56 wt. % |
| Mixed Viscosity (@ 25° C. and 10 rpm) | 5500 to 9500 mPa · s |
| pH | 7.5 to 9.5 |
| Heat activation temperature range | 55 to 85° C. |
| Bonding Temperature | 60° C. |
| Shelf life | 2 to 4 hrs |

The mixed dispersion can be disposed over some or all of a substrate main surface, edges and peripheral surfaces to be bonded. Water is removed from the dispersion on the substrate to form a polyurethane adhesive layer on the substrate surfaces and edges. The polyurethane adhesive layer can be cooled to a non-tacky state and stored if desired.

A first heating cycle is performed to heat the polyurethane adhesive layer on the substrate main surface and optionally the substrate peripheral surface and edges. In some variations the first heating cycle also dries water out of the applied adhesive. Typical the polyurethane adhesive layer is heated within the range of 55° C. to 85° C. Heating the polyurethane adhesive layer causes activation wherein the adhesive becomes tacky. A portion of flexible sheet material is disposed over the activated polyurethane adhesive layer and substrate main surface. In one variation, the material (PU foam) is disposed over the tacky polyurethane adhesive layer and main substrate surface. In this variation, adhesive along with main substrate and adhesive layer is heated to activate the adhesive and the material composite is disposed over the tacky polyurethane adhesive. Cooling of the polyurethane adhesive layer bonds the material to the substrate surface. After completion of the first heating cycle the peripheral surface and edges of the substrate are typically free of and not bonded to the material.

In one variation, the adhesive along with main substrate is heated to activate the PU adhesive. The material composite (PU foam) is also heated and disposed over the tacky polyurethane adhesive. Cooling of the polyurethane adhesive layer bonds the material to the substrate surface.

After the main surface is bonded to the material the peripheral surfaces and edges of the substrate are exposed to a secondary heating (second heating cycle) to reactivate the polyurethane adhesive layer thereon. Material can be wrapped around the edges and onto the peripheral surfaces by simple hand pressing. After the adhesive cools the material is bonded from the main surface, over the edges and onto the peripheral surface of the substrate. The foam is then wrapped around edges during secondary heating and the adhesive is reactivated to create a strong bonding around periphery of substrate.

The second heating cycle can be done 10 to 30 minutes after the first heating cycle. The polyurethane adhesive layer can be reactivated a third or more times if needed.

Embodiments of this adhesive exhibit some or all of the following advantages over known adhesives are, but not limited to:

1. The disclosed compositions are water-based adhesive and environmentally friendly.
2. The disclosed compositions have a low VOC as they do not have organic solvents.
3. The disclosed compositions are mixed and applied at room temperature (about 20° C.), which offers energy saving for a user.
4. The disclosed Part-A and Part-B may be mixed by simple agitation at room temperature, thereby offering ease of preparation.
5. The disclosed compositions can be used for edge wrapping applications by reactivation of adhesive one or multiple times.
6. Reactivation allows the disclosed adhesives to combine the low VOC, low energy use and environmentally friendly benefits of a water based adhesive while providing the quick initial tack of a solvent based adhesive and short contact times until bonding.
7. Reactivation allows a adhesive to be applied to a substrate and that component can be stored. The stored component is later reactivated and flexible sheet material disposed over the reactivated adhesive.

Preparation of Part-A

Initially, the following Premixes were made.

A. Premix Alkali: 5% of alkaline NaOH was prepared by adding 50 gm of NaOH into a one liter volumetric flask and diluted with water.

B. Premix Defoamer: 0.05% of defoamer was added into the anionic high molecular weight polyester polyurethane dispersion and stirred for 10 minutes.

C. Premix-Color: 0.07% of water based blue color was added to the water and stirred for 10 mins.

A two liter cylindrical flask equipped with overhead stirrer, was charged with the anionic high molecular weight polyester polyurethane dispersion in water and the anionic high molecular weight polyester polyurethane dispersion in water and stirred for 10 minutes. To this mixture 2% of water was added and stirred for 10 minutes. The non-foaming, nonionic surfactant was added to this mixture at lower speed to avoid foam formation and stirred for 10 minutes. The vinyl acetate-ethylene based copolymer was added slowly (over at least for 30 minutes). In this step, pH is desirably maintained greater than about 8.0. The pH was adjusted by adding the Premix Alkali (A.). The biocide was added to the mixture and mixed for 10 minutes. The Premix-Color (C) was added to the mixture and mixed for 10 minutes. Premix Defoamer (B) was added to the mixture and mixed. The rheology modifier was added until the Brookfield viscosity obtained in the range between 5000 and 9000 cP was achieved. Final pH was adjusted to be between about 8 and about 9.

Preparation of Part-B

Part-B included aliphatic polyisocyanate only and was used as it was received. Since Part-B is moisture sensitive, it was stored with proper sealing and in N₂ blanketing to exclude moisture.

A thin sheet of flexible polyurethane foam was used as the flexible sheet material. This material is often used to cover automobile interior panels. A polypropylene structure was used as the main substrate, edge and peripheral substrate. Surface energy of the polypropylene substrate bonding surfaces was increased either by flame treatment or corona treatment.

Application Method for Disposing Mixed Polyurethane Adhesive Dispersion on a Substrate Mixing The Part-B is mixed into the Part-A to make an adhesive product before the application of the adhesive. Typically, 5 parts by weight of the curing agent, e.g., Part-B, is added to 100 parts by weight of the resin dispersion, e.g., Part-A. Homogenous mixing was achieved by direct addition of the Part-B curing agent to the Part-A resin at room temperature with simple agitation.

Adhesive Bonding Process and Temperature

The mixed product may be sprayed on one surface of one substrate to be bonded or on the surfaces to be bonded of both substrates.

After application of the mixed product to the bonding surface the applied product is dried by evaporation of water. Drying can be done in at room temperature or accelerated by placing in an IR oven or an oven at a temperature of approximately 40° C. until water is removed. The dried polyurethane adhesive layer should be free of water.

The substrate and coated product may be heated in oven at about 60° C. to about 80° C. for about 2 minutes to about 4 minutes (first heating cycle).

The heated bonding surfaces of the substrates were pressed together and bonded. Bonding pressures of 0.6 to 1.0 N/mm² are useful.

Reactivation Process (Second Heating Cycle)

The reactivation of adhesive may be done by any suitable heating method, for example but not limited to, either by heating with a hot air gun or heating within an oven. For the former, exposing the part to about 200° C. to about 300° C. for a very short duration such as about 2 to about 4 seconds and for the latter, heating between about 60° C. to about 80° C. for about 15 seconds to about 30 seconds. The polyurethane foam was wrapped around edges of the adhesive coated PP or ABS (main) substrate. The bondline temperature observed to be about 55° C. to about 65° C. for reactivation process.

Adhesive Failure Strength

Adhesive failure strength was measured after 24 hrs. The foam substrate was cut by making a cross and subsequently peeled off with an Imada push-pull gauge. The adhesion of foam remaining to a substrate was noted substrate failure. This is a good result as the foam "failed", e.g., ripped or separated but the adhesive did not fail. An undesirable result is adhesion failure, where the foam did not "fail", e.g., did not rip or separate, but the adhesive failed to secure the components under the test conditions. The adhesion was also checked at cured/bending surfaces. Table 5 shows the adhesion comparisons of formulations F1 and F4. Formulations F2 and F3 had mixed mode of failure. The only formula that had 100% substrate failure was F1 and F4 formulations. However, reactivation could not be achieved for the F4 formulation. The bondline temperature for the structural bonding as well as for the reactivation was about 55° C. to about 65° C.

Different resin dispersions (Part-A) were prepared as shown below in Table 4. Compositions are in wt. %.

TABLE 4

Formulation for Composition Part-A

| Component Description | Formulation No. | | | |
|---|---|---|---|---|
| | F1 | F2 | F3 | F4 |
| Anionic high molecular weight polyester polyurethane dispersion¹ | 40 | 20 | 60 | 80 |
| Anionic high molecular weight polyester polyurethane dispersion² | 40 | 60 | 20 | 0 |
| Water | 6 | 6 | 6 | 6 |
| Non-foaming, nonionic surfactant ³ | (A) | (A) | (A) | (A) |
| Vinyl acetate-ethylene based copolymer⁴ | | | | |
| Water Based (blue) colorant | | | | |
| Biocide | | | | |
| Defoamer | | | | |
| Rheology modifier⁵ | | | | |

(A) Balance
¹(Dispercoll U 53) (from Covestro)
²Dispercoll U56 available from Covestro
³ (Surfynol 440) (from Evonik, formerly Air Products)
⁴Vinnapas EP 605 A available from Wacker Chemie AG
⁵(Acrysol ASE 60) (from DOW)

Part-B component properties of sample material are shown below in Table 5.

TABLE 5

Formulation Inventive Composition Part-B

| Raw Material | NCO content | HDI monomer content |
|---|---|---|
| Aliphatic Polyisocyanate¹ | 21.8 ± 0.6 | ≤0.25 |

¹Desmodur DN available from Covestro

Peel strength, failure mode and reactivation possibility of each Formulation shown below in Table 6.

TABLE 6

| | Formulation No. | | | |
|---|---|---|---|---|
| | F1 | F2 | F3 | F4 |
| Part A 95 wt. % | F1 | F2 | F3 | F4 |
| Part B 5 wt. % | B | B | B | B |
| Cured Adhesive Property | | | | |
| Peel strength (kgf) | 4 to 5 | 1.5 to 2.8 | not determined | 4 to 5 |
| Failure mode | Substrate Failure | Adhesion Failure | Mixed mode of failure | Substrate Failure |
| Reactivation | possible | possible | not possible | not possible |

Peel strength and failure mode of a mixed product of Part-A F1 with 5% and 4% Part-B is shown below in Table 7.

TABLE 7

| Specification | Formulation | |
| --- | --- | --- |
|  | F1 | F1 |
| Part A (F1) | 95 wt. % | 96 wt. % |
| Percent Part-B | 5 wt. % | 4 wt. % |
| Peel Strength (kgf) | 4 to 5 | 0.8 to 1.7 |
| Failure mode | Substrate Failure | Adhesion Failure |

With reference to the embodiment of FIG. 1, the following elements are shown:
2 substrate
4 substrate main surface
6 mixed adhesive
8 flexible sheet material PU foam)
10 substrate peripheral surfaces With reference to the embodiment of FIG. 1, the following steps are shown. Adhesive Part-A and Part-B are mixed to form a mixed, water-based, two component polyurethane dispersion adhesive 6. A substrate 2 having a main surface, a peripheral surface 10 angularly arranged to the main surface and an edge connecting the main surface 4 and the peripheral surfaces 10 is provided. Optionally, one or more of the surfaces 4, 10 can be pretreated. The mixed, water-based, two component polyurethane dispersion adhesive 6 is applied over the substrate surfaces 4, 10 and edges. The adhesive 6 is dried to remove water and form a dried, activated polyurethane adhesive layer on the substrate surfaces 4, 10 and edges. A first portion of a single piece of flexible sheet material 8 is disposed over the activated adhesive 6 on the main surface 4 to bond the first portion of material 8 to the main surface 4. Optionally, the adhesive 6 and substrate surfaces 4, 10 can be cooled below the adhesive activation temperature. Heat is applied to the substrate edges and peripheral surfaces 10 to reactivate adhesive 6 on the edges and peripheral surfaces 10. A second portion of the flexible sheet material 8 is wrapped from the substrate surface 4 over the heated and reactivated adhesive on the substrate edges and onto the peripheral surfaces 10 to bond the second portion of material 8 to the substrate edges and peripheral surfaces 10. The substrate, adhesive and bonded flexible sheet material is cooled below the adhesive activation temperature.

While various embodiments of the present inventive technology are specifically illustrated and/or described herein, it will be appreciated that modifications and variations of the present inventive technology may be effected by those skilled in the art without departing from the spirit and intended scope of the inventive technology. Further, any of the embodiments or aspects of the invention as described in the claims or in the specification may be used with one and another without limitation.

Furthermore, the embodiments or aspects of the invention or inventive technology described herein may be combined in any fashion and combination and be within the scope of the present invention.

What is claimed is:

1. A method of bonding a flexible sheet material to a substrate, comprising:
providing a substrate having a main surface, a peripheral surface angularly arranged to the main surface and an edge connecting the main surface and the peripheral surface;
providing a flexible sheet material having a second portion extending from a first portion;
providing a first component of a water-based, two component polyurethane dispersion adhesive;
providing a second component of the water-based, two component polyurethane dispersion adhesive;
mixing the first component and the second component to form a mixed, water-based, two component polyurethane dispersion adhesive;
applying the mixed adhesive to a portion of the main surface and to a portion of the peripheral surface;
drying the applied adhesive to form a dried polyurethane adhesive layer on the main surface and the peripheral surface;
applying a first heating cycle to activate the dried polyurethane adhesive layer on the main surface;
disposing the first portion of the flexible sheet material over the adhesive on the main surface;
bonding the first portion of material to the main surface;
optionally, cooling the polyurethane adhesive and substrate surfaces below the adhesive activation temperature;
applying a second heating cycle after the bonding step to heat the polyurethane adhesive layer on the peripheral surface above a reactivation temperature and reactivate the adhesive on the peripheral surface;
disposing the second portion of the flexible sheet material over the heated and reactivated adhesive on the peripheral surface to bond the second portion of material to the peripheral surface; and
optionally, cooling the polyurethane adhesive and substrate surfaces below the adhesive reactivation temperature.

2. The method of claim 1, wherein the substrate is polymeric.

3. The method of claim 1, wherein the substrate is comprised of polypropylene (PP) or acrylonitrile butadiene styrene (ABS) and the substrate main surface has been treated to increase surface energy.

4. The method of claim 1, wherein the flexible sheet material comprises a flexible polyurethane foam material.

5. The method of claim 1, wherein the step of applying the first heating cycle comprises heating the main surface and the first portion of flexible sheet material disposed on the main surface at about 60° C. to about 80° C. for about 2 to about 4 minutes.

6. The method of claim 1, wherein the step of applying the first heating cycle comprises heating the main surface at about 60° C. to about 80° C. for about 2 to about 4 minutes to activate the adhesive and disposing the first portion of flexible sheet material on the activated adhesive and main surface.

7. The method of claim 1, wherein the step of disposing a second portion of the flexible sheet material over the heated and reactivated adhesive comprises wrapping unsecured portions of the flexible sheet material over the edge and onto the peripheral surface.

8. The method of claim 1, wherein the steps of applying the second heating cycle and disposing a second portion of the flexible sheet material over the heated and reactivated adhesive comprise exposing the peripheral surface to a temperature of about 200° C. to about 300° C. for about 30 seconds or less subsequently wrapping the second portion of material onto the heated peripheral surface.

9. The method of claim 1, wherein the steps of applying the second heating cycle and disposing the second portion of material onto the peripheral surface comprise heating the second portion of material and peripheral surface at about 60° C. to about 80° C. for about 15 seconds to about 30 seconds and subsequently wrapping the material around the heated peripheral surface.

10. The method of claim 1, wherein the step of applying the second heating cycle comprises exposing the peripheral surface to a temperature of about 55° C. to about 85° C.

11. The method of claim 1, wherein the first component comprises at least one polyurethane resin dispersion and the second component comprises a solvent free and water free liquid aliphatic polyisocyanate cross-linker.

12. The method of claim 1, wherein the first component and second component are mixed before use to initiate a cross linking reaction.

* * * * *